(12) United States Patent
Gu et al.

(10) Patent No.: US 7,693,233 B2
(45) Date of Patent: Apr. 6, 2010

(54) PARALLEL TOMLINSON-HARASHIMA PRECODERS

(75) Inventors: Yongru Gu, Minneapolis, MN (US); Keshab K. Parhi, Maple Grove, MN (US)

(73) Assignee: Leanics Corporation, Maple Grove, MN (US)

( * ) Notice: Subject to any disclaimer, the term of this patent is extended or adjusted under 35 U.S.C. 154(b) by 794 days.

(21) Appl. No.: 11/181,347

(22) Filed: Jul. 13, 2005

(65) Prior Publication Data

US 2007/0014380 A1    Jan. 18, 2007

(51) Int. Cl.
*H04K 1/02*    (2006.01)
(52) U.S. Cl. .................. 375/296; 712/E9.043; 714/808; 714/E11.033; 375/242; 375/286
(58) Field of Classification Search .................. 375/316, 375/346, 350; 370/201; 455/296
See application file for complete search history.

(56) References Cited

U.S. PATENT DOCUMENTS

| | | | |
|---|---|---|---|
| 2002/0122503 A1* | 9/2002 | Agazzi | 375/316 |
| 2003/0086515 A1* | 5/2003 | Trans et al. | 375/346 |
| 2006/0056521 A1 | 3/2006 | Parhi | |
| 2007/0014345 A1 | 1/2007 | Gu et al. | |

OTHER PUBLICATIONS

Harashima, Hiroshi et al; Matched-Transmission Technique for Channels with Intersymbol Interference; IEEE Transactions on Communications; Aug. 1972; pp. 774-780.

Parhi et al.; Pipeline Interleaving and parallelism in recursive digital filters. I. Pipelining using a scattered look-ahead decomposition; IEEE Transactions on Acoustics, Speech and Signal Processing; Jul. 1989; pp. 1099-1117.

Parhi Keshab K.; Pipelining in algorithms with quantizer loops; IEEE Transactions on Circuits & Systems; Jul. 1991; pp. 745-754.

Gu, Yongru et al; Pipelining Tomlinson-Harashima Precoders; IEEE International Symposium on Circuits & Systems; May 23-26, 2005; pp. 408-411.

Wesel, Richard et al; Achievable Rates for Tomlinson-Harashima Precorders; IEEE Transactions on Information Theory; Mar. 1998; pp. 824-831.

Harashima, Hiroshi et al., Matched-Transmission Technique For Channels IEEE Transactions on Communications (Aug. 1972) 774-780.

Parhi, Keshab K., et al., Pipeline Interleaving and Parallelism In Recursive IEEE Transactions on Acoustics, Speech & Signal Processing (Jul. 1989), 1099-1117.

(Continued)

*Primary Examiner*—David C Payne
*Assistant Examiner*—Adolf Dsouza
(74) *Attorney, Agent, or Firm*—Patrick E. Garrett

(57) ABSTRACT

A method to design parallel TH precoders and a circuit architecture to implement parallel TH precoders have been presented. The parallel design relies on the fact that a TH precoder can be viewed as an IIR filter with an input equal to the sum of the original input to the TH precoder and a compensation signal. The parallel design also relies on the fact that the compensation signal has finite levels. Therefore, precomputation techniques can be applied to calculate intermediate signal values for all possible values of the compensation signal.

6 Claims, 9 Drawing Sheets

OTHER PUBLICATIONS

Parhi, Keshab K., "Pipelining in Algorithms with Quantizer Loops", IEEE Transactions on Circuit and Systems (Jul. 1991), 745-754.

Gu, Yongru et al., "Pipelining Tomlinson-Harashima Precoders", IEEE International Symposijm on Circuits & Systems; May 23-26, 2005, pp. 408-411.

Wesel, Richard D., et al., Achievable Rates for Tomlinson-Harashima Preco IEEE Transactions on Information Theory (Mar. 1998), 824-831.

* cited by examiner

Table 1

|  | Straightforward-THP | 2-Para-THP | 3-Para-THP |
|---|---|---|---|
| Multipliers | $L$ | $2L + 1$ | $3L + 3$ |
| Adders | $L$ | $2L + 2N$ | $3L + 2N + 2N^2 + 1$ |
| Modulo Devices | 1 | $N + 1$ | $1 + N + N^2$ |
| Multiplexers | None | One $W$-bit $N$-to-1 mux | One $W$-bit $N$-to-1 mux<br>One $W$-bit $N^2$-to-1 mux |
| Critical Path | $2T_a + T_m + T_{mod}$ | $2T_a + T_m + T_{mod} + T_{mux}$ | $3T_a + T_m + T_{mod} + 2T_{mux}$ |

FIG. 9

Table 2

|  | Straightforward-THP | 2-Para-THP | 3-Para-THP |
|---|---|---|---|
| Multipliers | $2L$ | $6L + 1$ | $9L + 3$ |
| Adders | $2L$ | $6L + 2N$ | $9L + 2N + 2N^2 + 1$ |
| Modulo Devices | 1 | $N + 1$ | $1 + N + N^2$ |
| Multiplexers | None | One $W$-bit $N$-to-1 mux<br>One $W_v$-bit $N$-to-1 mux | One $W$-bit $N$-to-1 mux<br>One $W_v$-bit $N$-to-1 mux<br>One $W$-bit $N^2$-to-1 mux<br>One $W_v$-bit $N^2$-to-1 mux |
| Critical Path | $5T_a + 2T_m + T_{mod}$ | $4T_a + T_m + T_{mod} + T_{mux}$ | $6T_a + T_m + T_{mod} + 2T_{mux}$ |

FIG. 10

PARALLEL TOMLINSON-HARASHIMA PRECODERS

STATEMENT REGARDING FEDERALLY-SPONSORED RESEARCH AND DEVELOPMENT

This invention was made with Government support under the SBIR grant # DMI-0441632, awarded by the National Science Foundation. The Government has certain rights in this invention.

FIELD OF THE INVENTION

The present invention relates to data processing and transmission. More particularly, it relates to parallel Tomlinson-Harashima precoding of data and parallel Tomlinson-Harashima precoders.

BACKGROUND OF THE INVENTION

Tomlinson-Harashima precoding (TH precoding) is a transmitter equalization technique where equalization is performed at the transmitter side, and has been widely used in many communication systems. It can eliminate error propagation and allows use of capacity-achieving channel codes, such as low-density parity-check (LDPC) codes, in a natural way.

Recently, TH precoding has been proposed to be used in 10 Gigabit Ethernet over copper (10GBASE-T). The symbol rate of 10GBASE-T is 800 Mega Baud. However, a TH precoder contains feedback loops, and it may be impossible to clock the straightforward implementation of the TH precoder at such high speed. Thus, high speed design of TH precoders is of great interest.

How to design a fast TH precoder is a challenging task. The architecture of a TH precoder is similar to that of a DFE (decision feedback equalizer). The only difference is that a quantizer in the DFE is replaced with a modulo device in the TH precoder. In a PAM-M (M-level pulse amplitude modulation) system, the number of different outputs of the quantizer in the DFE is finite, which is usually equal to the size of the symbol alphabet, i.e., M. However, theoretically, the number of different outputs of the modulo device in the TH precoder is infinite for a floating-point implementation. For a fixed-point implementation, it is exponential with the wordlength. In some applications, the wordlength can be very large. Thus, many known techniques exploiting the property of finite-level outputs of the nonlinear element in the DFE, such as the pre-computation technique (See, e.g., in K. K. Parhi, "Pipelining in algorithms with quantizer loops," *IEEE Trans. on Circuits and Systems*, vol. 37, no. 7, pp. 745-754, July 1991), cannot be directly applied to pipeline the TH precoder. Furthermore, the use of look-ahead techniques in the TH precoder, such as those for pipelining IIR filters (See, e.g., K. K. Parhi and D. G. Messerschmitt, "Pipeline interleaving and parallelism in recursive digital filters, Part I and Part II," *IEEE Trans. Acoust., Speech, Signal Processing*, pp. 1099-1135, July 1989), is not straightforward as the TH precoder contains nonlinear elements in its feedback loops.

What is needed is a fast TH precoder and a method for designing the same, which can fully exploit the properties of a TH precoder.

BRIEF SUMMARY OF THE INVENTION

The present invention provides a fast TH precoder through parallel processing and a method for designing the parallel TH precoder.

In accordance with the present invention, a TH precoder is first converted to its equivalent form where the TH precoder can be viewed as an IIR filter with an input equal to the sum of the original input to the TH precoder and a finite-level compensation signal. Next, a parallel IIR filter is obtained by applying classical look-ahead techniques to the equivalent IIR filter. Then, the resulting parallel IIR filter is reformulated as an intermediate parallel Tomlinson-Harashima precoder by removing the compensation signal as an explicit input to the IIR filter. Finally, precomputation technique is applied to the intermediate design, resulting in a parallel Tomlinson-Harashima precoder.

Further embodiments, features, and advantages of the present invention, as well as the structure and operation of the various embodiments of the present invention are described in detail below with reference to accompanying drawings.

BRIEF DESCRIPTION OF THE DRAWINGS/FIGURES

The present invention is described with reference to the accompanying figures. In the figures, like reference numbers indicate identical or functionally similar elements. Additionally, the left-most digit or digits of a reference number identify the figure in which the reference number first appears. The accompanying figures, which are incorporated herein and form part of the specification, illustrate the present invention and, together with the description, further serve to explain the principles of the invention and to enable a person skilled in the relevant art to make and use the invention.

FIG. 1*a* illustrates a zero-forcing pre-equalization function.

FIG. 1*b* illustrates a Tomlinson-Harashima (TH) precoding function.

FIG. 1*c* illustrates an equivalent form of a TH precoder function.

FIG. 9 (Table 1) lists the complexity and critical path for a straightforward L-tap FIR TH precoder (Straightforward-THP), its corresponding 2-parallel design (2-Para-THP) and 3-parallel design (3-Para-THP).

FIG. 10 (Table 2) lists the complexity and critical path for a straightforward L-th order IIR TH precoder (Straightforward-THP), its corresponding 2-parallel design (2-Para-THP) and 3-parallel design (3-Para-THP).

DETAILED DESCRIPTION OF THE INVENTION

Background on Tomlinson-Harashima Precoding

Figure 1:
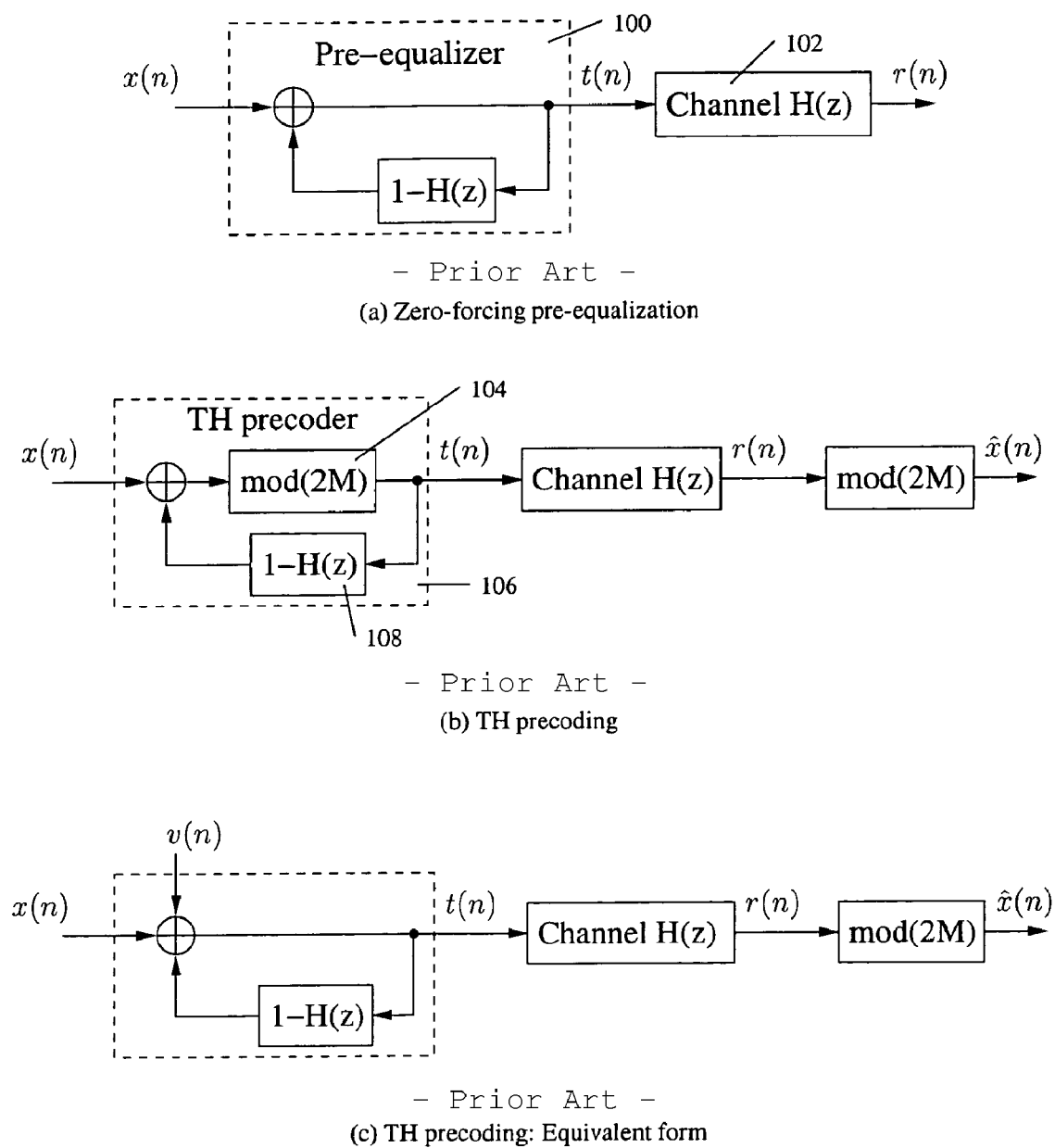

Consider a discrete-time channel $$H(z) = 1 + \sum_{i=1}^{L_H} h_i z^{-i},\qquad\text{EQ. (1)}$$

where $L_H$ is the channel memory length. We assume that the model is known at the transmitter side. We also assume that the transmitted symbols are PAM-M symbols, where the symbol set is $\{\pm 1, \pm 3, \ldots, \pm(M-1)\}$. To remove inter-symbol interference (ISI), we can use zero-forcing pre-equalization, which basically implements the inverse of the channel transfer function at the transmitter side, as illustrated in FIG. 1(a). However, one problem associated with the scheme in FIG. 1(a) is that the output of the pre-equalizer has a large dynamic range, which may even be unlimited.

Tomlinson and Harashima (See, M. Tomlinson, "New automatic equalizer employing modulo arithmetic," *Electron. Lett.*, vol. 7, pp. 138-139, March 1971; and H. Harashima and H. Miyakawa, "Matched-transmission technique for channels with intersymbol interference," *IEEE Trans. Commun.*, vol. 20, pp. 774-780, August 1972) proposed to limit the output dynamic range by using a nonlinear modulo device in the feedforward path of the pre-equalizer, as shown in FIG. 1(b). The resulting pre-equalizer is called a TH precoder. The operation of TH precoding can be interpreted by using the equivalent form of the TH precoder in FIG. 1(c). A unique compensation signal v(n), which is a multiple of 2M, is added to the transmitted PAM-M signal x(n) such that the output of the precoder t(n) is limited in the interval [−M, M). So the effective transmitted data sequence in z-domain is given by $$T(z) = \frac{X(z) + V(z)}{H(z)}.\qquad\text{EQ. (2)}$$

The received signal is $$R(z) = H(z)\frac{X(z) + V(z)}{H(z)} = X(z) + V(z)\qquad\text{EQ. (3)}$$

and X(z) can be recovered from R(z) by performing a modulo operation. An important property of v(n) is that it only has finite levels since v(n) is a multiple of 2M and $|v(n)| \leq (1+\sum_{i=1}^{L_H}|h_i|)M$.

Figure 2:
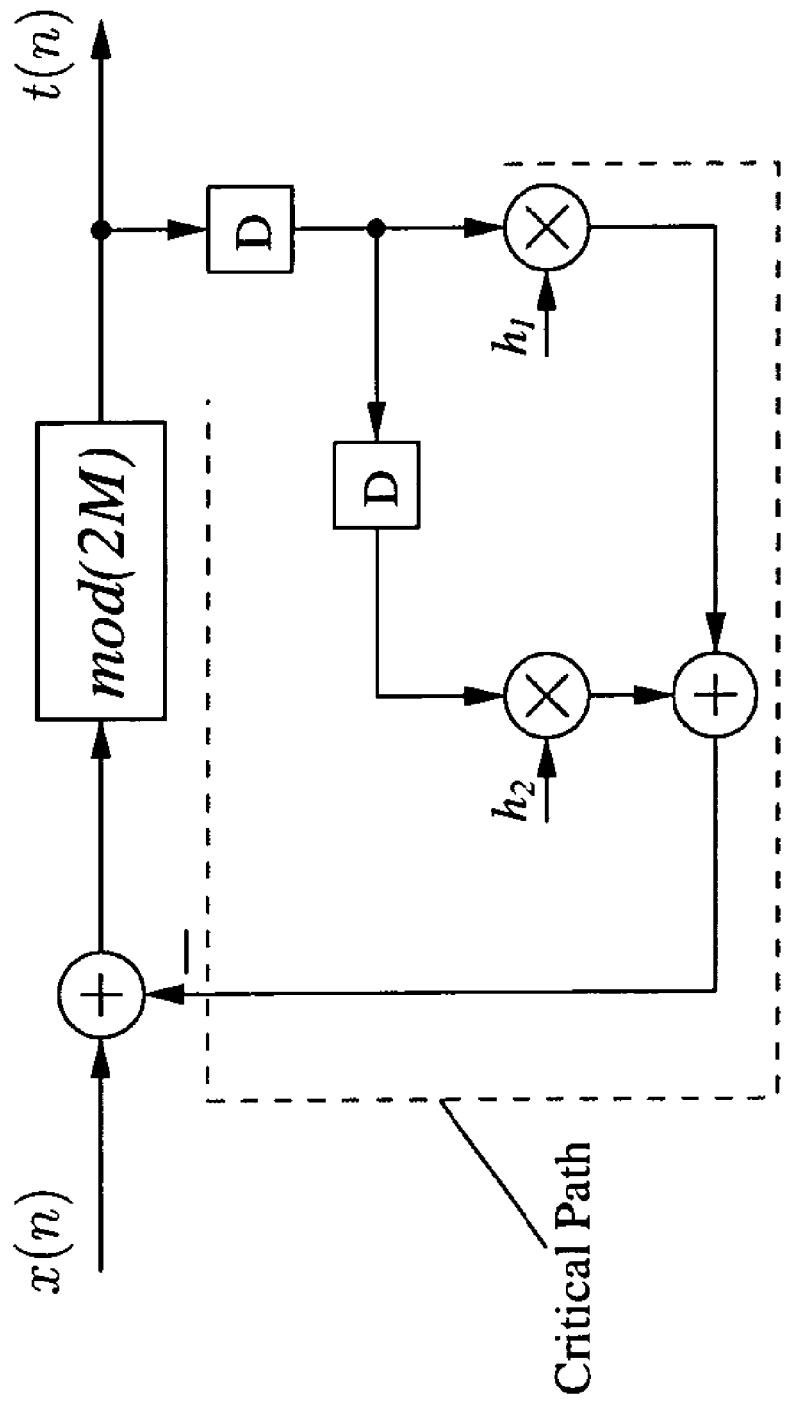
FIG. 2 shows the straightforward architecture of a 2nd-order FIR TH precoder as well as its critical path.

FIG. 2 shows the straightforward architecture of a 2nd-order TH precoder. It has a critical path consisting of one multiplier, two adders and one modulo device. The computation time of the critical path is $$T_{Critical}=2T_a+T_m+T_{mod},\qquad\text{EQ.(4)}$$

where $T_a$, $T_m$ and $T_{mod}$ denote the computation times of an addition, a multiplication and a modulo operation, respectively (Note: $T_{mod}=0$ when M is a power of 2). From the figure, we can see that the iteration bound, $T_\infty$ (For the definition of iteration bound, please see K. K. Parhi, *VLSI Digital Signal Processing Systems Design and Implementation*, John Wiley & Son, Inc., New York, 1999), of the architecture is also equal to $T_{Critical}$, i.e., $$T_\infty=T_{Critical}=2T_a+T_m+T_{mod}.\qquad\text{EQ.(5)}$$

The achievable minimum clock period of this architecture is limited by $T_\infty$, i.e., we cannot operate the precoder at a speed higher than $1/T_\infty$. Classical high-speed design techniques such as retiming and unfolding cannot be used to achieve higher speed since the iteration bound is a fundamental limit. Thus it is important to develop techniques to design a fast TH precoder.

A Method to Design Parallel Tomlinson-Harashima Precoders

As shown in FIG. 1(c), a TH precoder can be viewed as an IIR filter with an input equal to the sum of the original input to the TH precoder and a finite-level compensation signal. Thus, it is possible to design fast TH precoders based on classical pipelining and parallel processing techniques for IIR filters.

In the present invention, the first step to design a parallel TH precoder is to convert the original TH precoder to its equivalent form. Next, the classical clustered look-ahead technique is applied to the equivalent form to obtain a parallel IIR filter. The parallel IIR filter requires the compensation signal as an explicit input. To explicitly remove the compensation signal as an input, modulo devices are re-introduced to the parallel IIR filter, resulting in an intermediate parallel TH precoder. The intermediate parallel precoder still has a very long critical path. To reduce the critical path, the precomputation technique is applied. For a 2-parallel design, the resulting final architecture can achieve a speedup of about 2.

Parallel Tomlinson-Harashima Precoders: An Example

Let us look at an example where we want to design a 2-parallel TH precoder. Consider a 2nd-order inter-symbol interference (ISI) channel described by an FIR (finite impulse response) model $$H(z)=1+h_1z^{-1}+h_2z^{-2}.\qquad\text{EQ.(6)}$$

The corresponding FIR TH precoder can be described as $$t(n)=\text{MOD}(-h_1t(n-1)-h_2t(n-2)+x(n),2M),\qquad\text{EQ.(7)}$$

where MOD(*, 2M) is a modulo operation by 2M.

The equivalent form of the TH precoder in EQ. (7) can be represented as:

$$t(n)=-h_1t(n-1)-h_2t(n-2)+x(n)+v(n),\qquad\text{EQ.(8)}$$

where v(n) is a compensation signal. The 2-stage look-ahead equation of EQ. (8) can be obtained by the clustered look-ahead technique (See, e.g., K. K. Parhi, *VLSI Digital Signal Processing Systems Design and Implementation*, John Wiley & Son, Inc., New York, 1999):

$$t(n) = (h_2^1 - h_2)t(n-2) + h_1h_2t(n-3) -\qquad\text{EQ. (9)}$$
$$h_1x(n-1) - h_1v(n-1) + x(n) + v(n).$$

The parallel IIR (infinite impulse response) system can be obtained by substituting n=2k+1 and n=2k+2 into EQ. (8) and EQ. (9), respectively, and is described by:

$$t(2k+1) = -h_1 t(2k) - h_2 t(2k-1) + x(2n+1) + v(2k+1) \quad \text{EQ. (10)}$$
$$t(2k+2) = (h_1^2 - h_2)t(2k) + h_1 h_2 t(2k-1) -$$
$$h_1 x(2k+1) - h_1 v(2k+1) + x(2k+2) + v(2k+2).$$

v(2k+1) and v(2k+2) can be removed as explicit inputs to the above parallel IIR filter by re-introducing a modulo operation as follows, resulting in an intermediate parallel TH precoder:

$$t(2k+1) = \text{MOD}(-h_1 t(2k) - h_2 t(2k-1) + x(2n+1), 2M) \quad \text{EQ. (11)}$$
$$t(2k+2) = \text{MOD}((h_1^2 - h_2)t(2k) + h_1 h_2 t(2k-1) -$$
$$h_1 x(2k+1) - h_1 v(2k+1) + x(2k+2), 2M).$$

Figure 3:
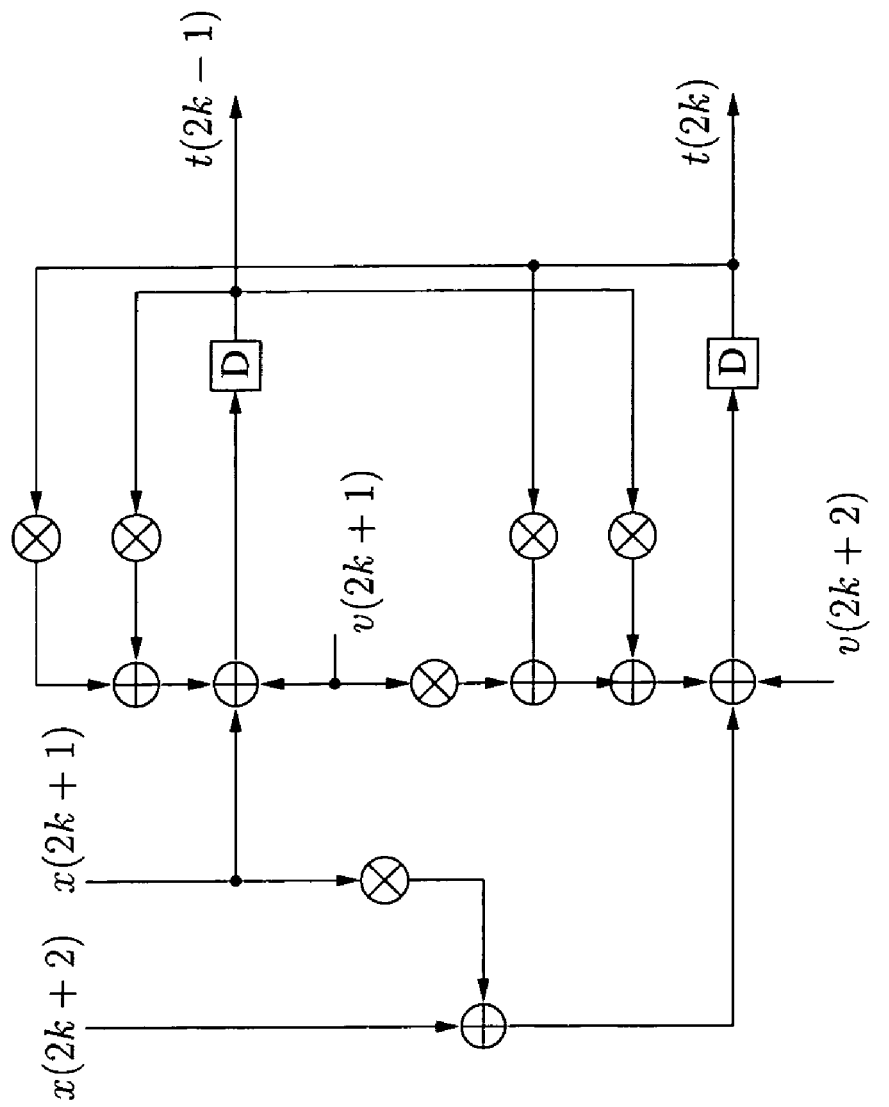
FIG. 3 illustrates the 2-parallel equivalent IIR filter of a 2nd order FIR TH precoder.
Figure 4:
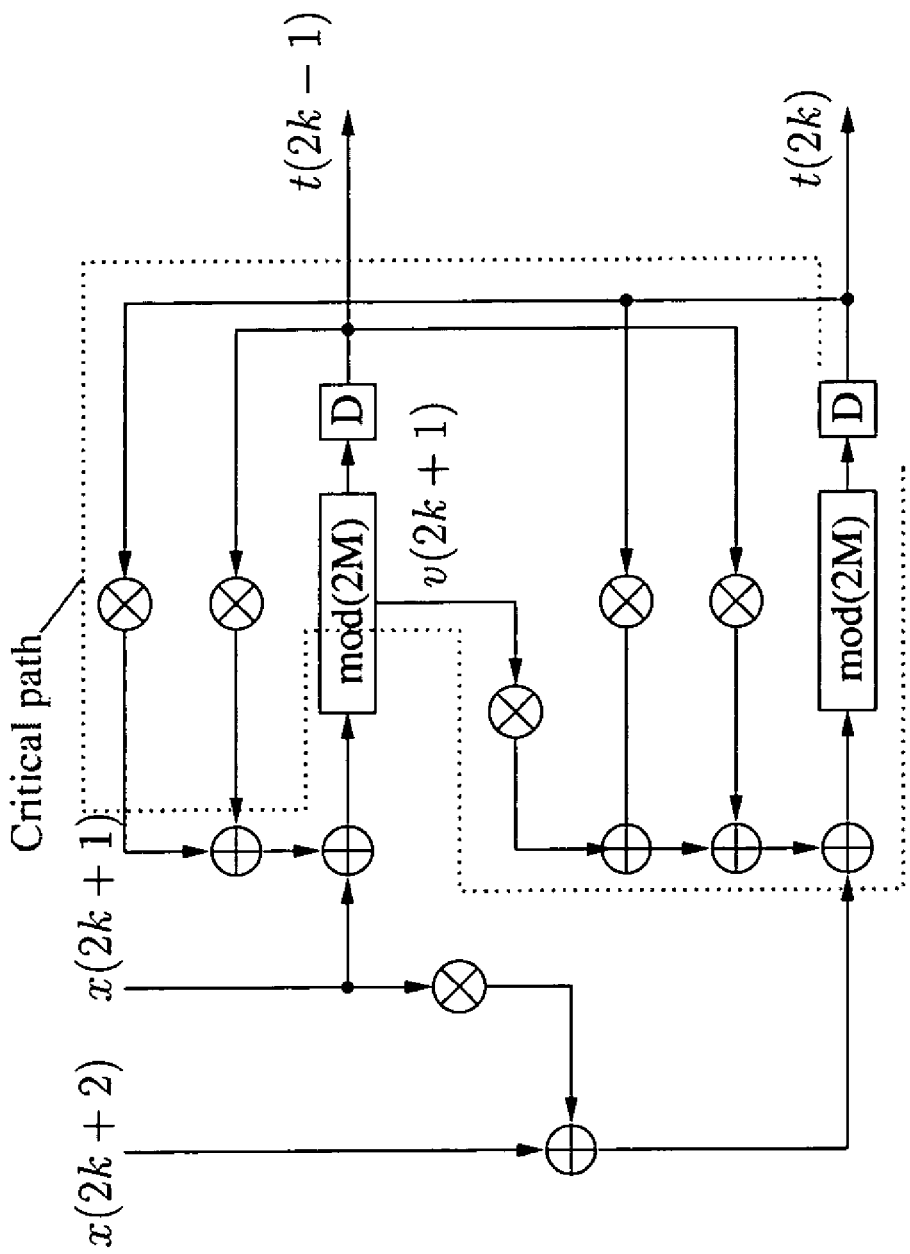
FIG. 4 illustrates the intermediate parallel TH precoder.
Figure 5:
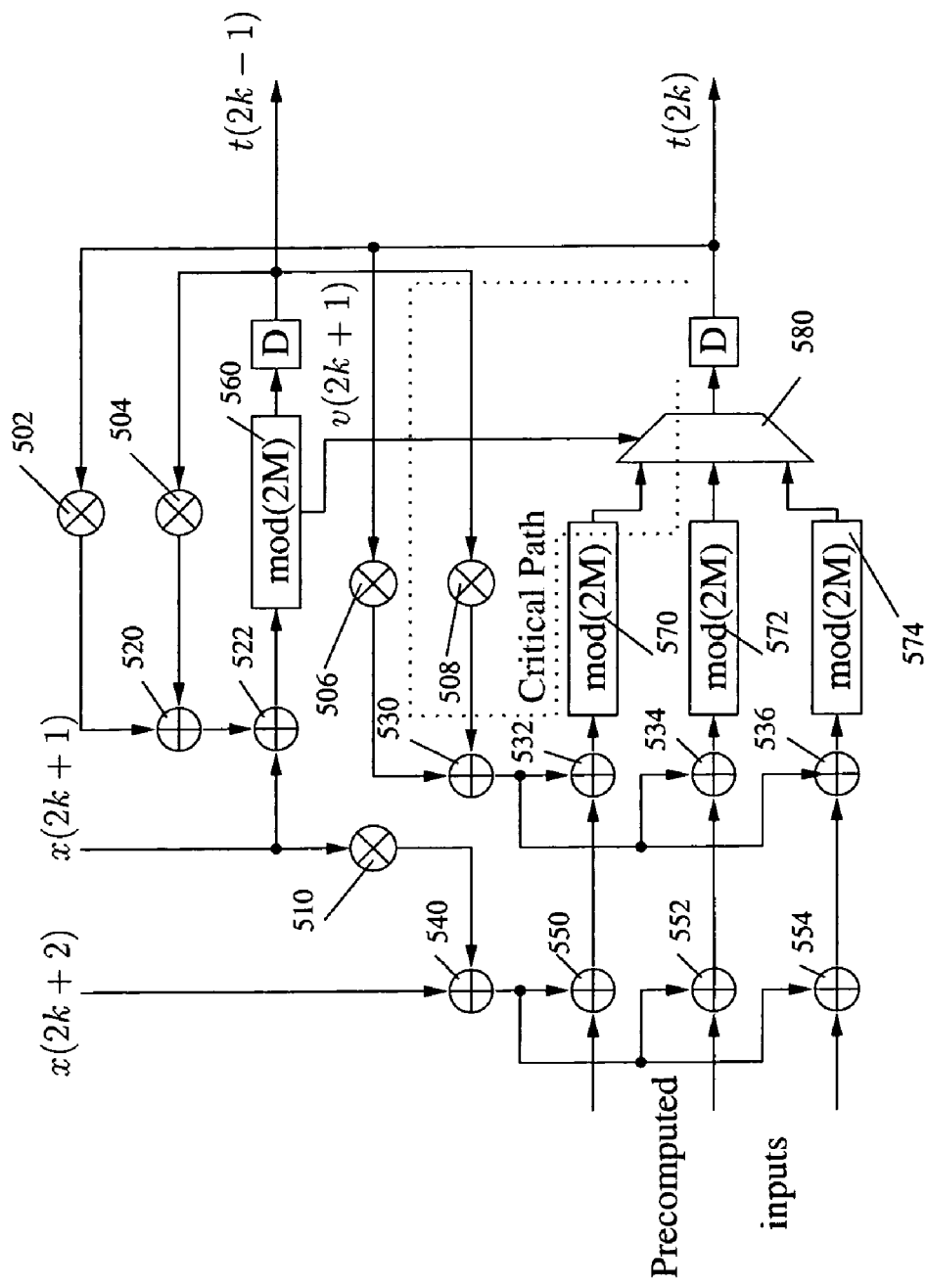
FIG. 5 illustrates the parallel Tomlinson-Harashima precoder.

FIG. 3 shows the parallel equivalent IIR filter architecture for the precoder, and FIG. 4 illustrates the intermediate parallel precoders. From FIG. 4, we can see that there is a long critical path which consists of five additions, two multiplications, and two modulo operations. Compared with the straightforward implementation in FIG. 2, the improvement is not significant. However, as the compensation signal v(2k+1) only has finite possibilities, we can use precomputation to shorten the critical path, as illustrated in FIG. 5 (In the figure, we assume v(2k+1) has only three levels). From the figure, we can see that the critical path is reduced to two additions, one multiplication and one modulo operation and one multiplexing operation, i.e., $$T_{Critical} = 2T_a + T_m + T_{mod} + T_{mux}, \quad \text{EQ.(12)}$$

where $T_{mux}$ is the computation time of a multiplexer. The critical path in the parallel design is only one multiplexing operation longer than that in the straightforward architecture in FIG. 2. However, the parallel design every time processes two samples and computes two outputs. Thus, it can achieve a speedup of almost 2 since $T_{mux}$ is usually much smaller than $T_a$ and $T_m$.

Generalization

The present method to design parallel TH precoders can be used to design parallel precoder for order more than 2 and parallelism level more than 2. It can be also used to design parallel IIR TH precoders.

Let us look at an example where we want to design a 2-parallel TH precoder for a 2nd-order ISI IIR channel $$H(z) = \frac{1 + b_1 z^{-1} + b_2 z^{-2}}{1 + a_1 z^{-1} + a_2 z^{-2}}. \quad \text{EQ. (13)}$$

Figure 6:
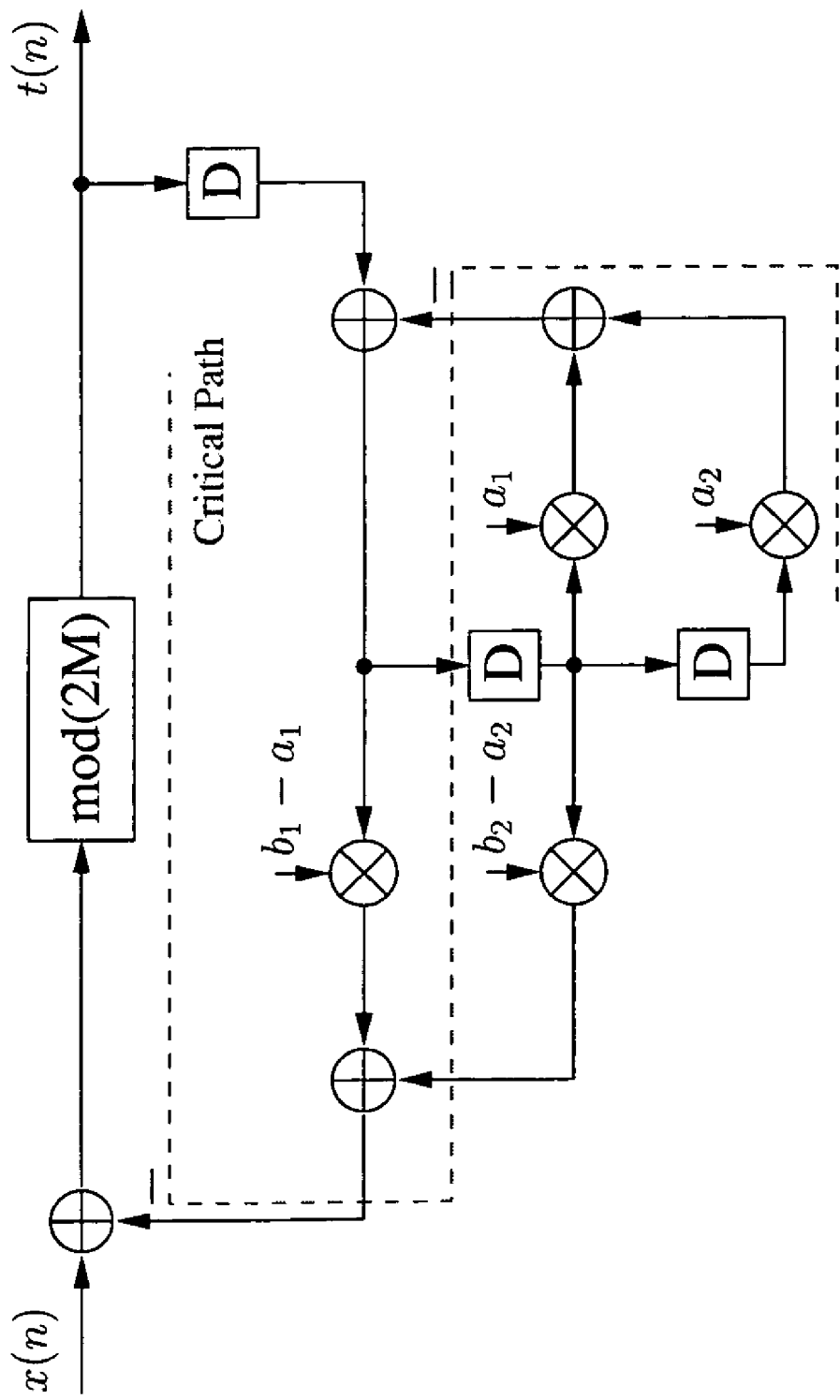
FIG. 6 shows the straightforward architecture of a 2nd-order IIR TH precoder and its critical path.

The corresponding TH precoder can be described as $$t(n) = \text{MOD}(x(n) - f(n), 2M), \quad \text{EQ.(14)}$$

where f(n) is the inverse z-transform of (H(z)−1)T(z). Its straightforward architecture is shown in FIG. 6. The critical path of the architecture is $$T_{Critical} = 4T_a + 2T_m + T_{mod}, \quad \text{EQ.(15)}$$

and the iteration bound, $T_\infty$, of the architecture is $$T_\infty = 3T_a + T_m + T_{mod}. \quad \text{EQ.(16)}$$

The inherent speed is limited by the iteration bound.

The equivalent form of the IIR TH precoder in EQ. (14) can be represented as:

$$t(n) = -b_1 t(n-1) - b_2 t(n-2) + x(n) + a_1 x(n-1) + \quad \text{EQ. (17)}$$
$$a_2 x(n-2) + v(n) + a_1 v(n-1) + a_2 v(n-2).$$

If we define w(n)≡x(n)+$a_1$x(n−1)+$a_2$x(n−2), then EQ. (17) becomes $$t(n) = -b_1 t(n-1) - b_2 t(n-2) + \quad \text{EQ. (18)}$$
$$w(n) + v(n) + a_1 v(n-1) + a_2 v(n-2).$$

The 2-stage look-ahead equation of EQ. (18) can be obtained by substituting t(n−1) into EQ. (18):

$$t(n) = -b_1\{-b_1 t(n-2) - b_2 t(n-3) + w(n-1) + v(n-1) + \quad \text{EQ. (19)}$$
$$a_1 v(n-2) + a_2 v(n-3)\} - b_2 t(n-2) + w(n) + v(n) +$$
$$a_1 v(n-1) + a_2 v(n-2)$$
$$= (b_1^2 - b_2)t(n-2) + b_1 b_2 t(n-3) + w(n) - b_1 w(n-1) +$$
$$v(n) + (a_1 - b_1)v(n-1) + (a_2 - b_1 a_1)v(n-2) -$$
$$b_1 a_2 v(n-3).$$

The corresponding parallel IIR system can be obtained by substituting n=2k+1 and n=2k+2 into equation EQ. (18) and EQ. (19), respectively, and is described by:

$$t(2k+1) = -b_1 t(2k) - b_2 t(2k-1) + \quad \text{EQ. (20)}$$
$$w(2k+1) + v(2k+1) + a_1 v(2k) + a_2 v(2k-1),$$

$$t(2k+2) = (b_1^2 - b_2)t(2k) + b_1 b_2 t(2k-1), \quad \text{EQ. (21)}$$
$$+w(2k+2) - b_1 w(2k+1) + v(2k+2) +$$
$$(a_1 - b_1)v(2k+1) + (a_2 - b_1 a_1)v(2k) - b_1 a_2 v(2k-1).$$

v(2k+1) in EQ. (20) and v(2k+2) in EQ. (21) can be removed by re-introducing modulo operations as follows:

$$t(2k+1) = \text{MOD}(-b_1 t(2k) - b_2 t(2k-1) + \quad \text{EQ. (22)}$$
$$w(2k+1) + a_1 v(2k) + a_2 v(2k-1), 2M),$$

$$t(2k+2) = \text{MOD}((b_1^2 - b_2)t(2k) + b_1 b_2 t(2k-1) + \quad \text{EQ. (23)}$$
$$w(2k+2) - b_1 w(2k+1) + (a_1 - b_1)v(2k+1) +$$
$$(a_2 - b_1 a_1)v(2k) - b_1 a_2 v(2k-1), 2M).$$

Figure 7:
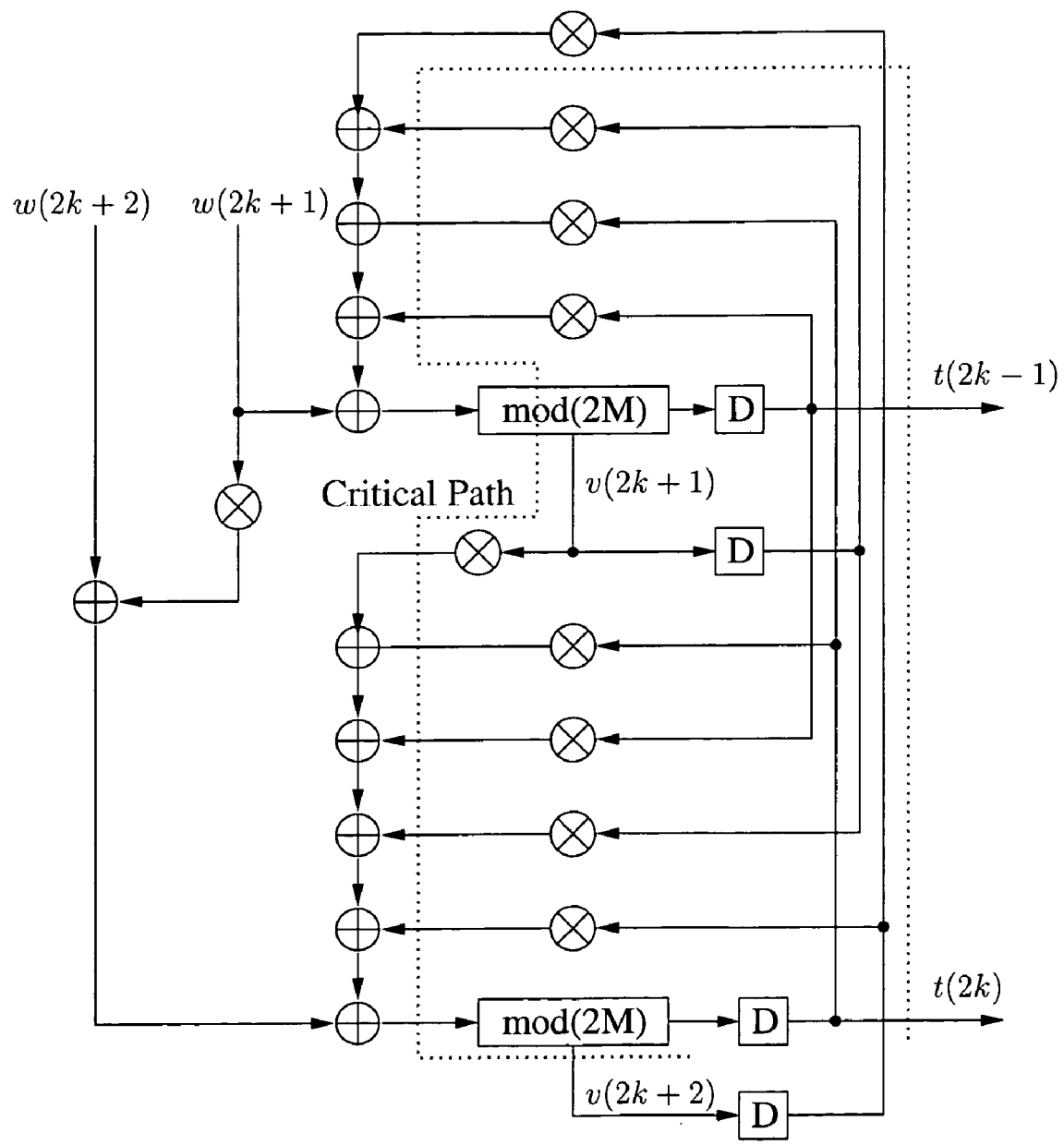
FIG. 7 illustrates the intermediate IIR parallel TH precoder.

FIG. 7 shows the corresponding architecture for the intermediate parallel precoder described by EQ. (22) and EQ. (23). It has a long critical path consisting of two multipliers, 9 adders and two modulo devices.

Figure 8:
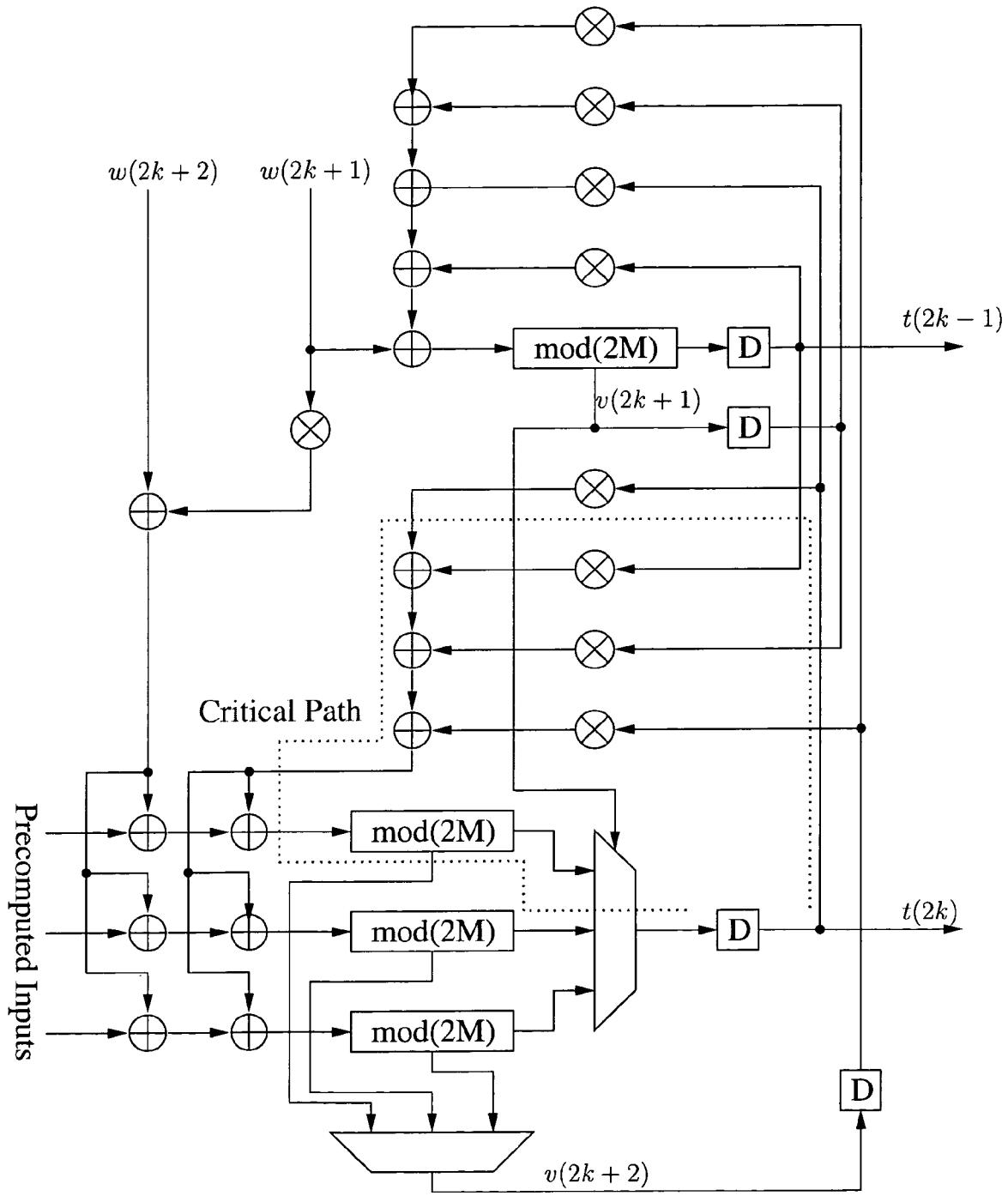
FIG. 8 illustrates the parallel IIR Tomlinson-Harashima precoder.

If the compensation signal v(2k+1) in FIG. 7 has finite possibilities (this is true when the transfer function H(z) is stable), we can use precomputation to shorten the critical path, as illustrated in FIG. 8. In this figure, we assume v(2k+1) has only three levels. From the figure, we can see that the critical path is reduced to four additions, one multiplication and two modulo operations and one multiplexing operation. The computation time of the critical path is $$T_{critical} = 4T_a + T_m + 2T_{mod} + T_{mux}. \quad \text{EQ.(24)}$$

The parallel design every time processes two samples and computes two outputs, so we can achieve a sample period $$T_{Sample} = 2T_a + T_m/2 + T_{mod} + T_{mux}/2. \quad \text{EQ.(25)}$$

The computation of a multiplier is usually much longer than those of an adder and a multiplexer, and hence speedup is achieved.

Complexity and Critical Path Comparison

In this section, we compare the complexity and critical path for a straightforward L-tap FIR TH precoder (Straightforward-THP), its corresponding 2-parallel design (2-Para-THP) and 3-parallel design (3-Para-THP).

Table 1 compares the complexity for the straightforward L-tap FIR THP, 2-Para-THP and 3-Para THP. In this table, we assume that the number of possibilities of the compensation signal is N. The straightforward THP needs L multipliers, 2 adders and one modulo device. The 2-Para-THP needs 2L+1 multipliers. Among the 2L+1 multipliers, 2L multipliers are used for loop update for the two-parallel outputs t(2k−1) and t(2k). In FIG. 5, these 2L multipliers are those parts numbered as 502, 504, 506, and 508 (The design in FIG. 5 is a 2-parallel design of a 2-tap THP, i.e., L=2). The remaining one is used to pre-process the 2-parallel inputs x(2k+1) and x(2k+2). In FIG. 5, this multiplier is the one numbered as 510. The 2-Para-THP needs L+L−1+N+1+N=2L+2N adders. Among them, L adders are used for loop update for the output t(2k−1). In FIG. 5, they correspond to the parts numbered as 520 and 522. L−1+N adders are used for loop update for the output t(2k). In FIG. 5, they correspond to the parts numbered as 530, 532, 534 and 536 (In the figure, we assume that N=3). One adder is used for the preprocessing of the 2-parallel inputs x(2k+1) and x(2k+2). In FIG. 5, this adder is the one numbered as 540. The remaining N adders are used for precomputation. These adders are numbered as 550, 552 and 556 in FIG. 5. The 2-Para-THP needs 1+N modulo devices. One of them is used for loop update for t(2k−1). In FIG. 5, it is numbered as 560. The rest are used for loop update for t(2k). In FIG. 5, they are numbered as 570, 572, and 574. The 2-Para THP also needs one W-bit N-to-1 multiplexer (mux) (Assume that the wordlength requirement is W). In FIG. 5, it corresponds to the part numbered as 580.

For a 3-parallel TH precoder, we need 3L+2 multipliers, 3L+2N+2N² adders, 1+N+N² modulo devices, one W-bit N-to-1 mux and one W-bit N²-to-1 mux.

Table 1 also lists the critical paths for the straightforward THP, 2-Para-THP and 3-Para-THP, which are $2T_a+T_m+T_{mod}$, $2T_a+T_m+T_{mod}+T_{mux}$, and $3T_a+T_m+T_{mod}+2T_{mux}$, respectively.

Table 2 compares the complexity and the critical path for the straightforward L-th order IIR TH precoder (Straightforward-THP), its corresponding 2-parallel design (2-Para-THP) and 3-parallel design (3-Para-THP).

CONCLUSIONS

A method to design parallel Tomlinson-Harashima precoders based on classical look-ahead and precomputation techniques and properties of Tomlinson-Harashima precoders. The resulting parallel TH precoders can be used for high-speed communication applications, such as 10 Gigabit Ethernet over copper.

While various embodiments of the present invention have been described above, it should be understood that they have been presented by way of example only, and not limitation. It will be understood by those skilled in the art that various changes in form and details can be made therein without departing from the spirit and scope of the invention as defined in the appended claims. Thus, the breadth and scope of the present invention should not be limited by any of the above-described exemplary embodiments, but should be defined only in accordance with the following claims and their equivalents.

TABLE 1

|  | Straightforward-THP | 2-Para-THP | 3-Para-THP |
| --- | --- | --- | --- |
| Multipliers | L | 2L + 1 | 3L + 3 |
| Adders | L | 2L + 2N | 3L + 2N + 2N² + 1 |
| Modulo Devices | 1 | N + 1 | 1 + N + N² |
| Multiplexers | None | One W-bit N-to-1 mux | One W-bit N-to-1 mux One W-bit N²-to-1 mux |
| Critical Path | $2T_a + T_m + T_{mod}$ | $2T_a + T_m + T_{mod} + T_{mux}$ | $3T_a + T_m + T_{mod} + 2T_{mux}$ |

TABLE 2

|  | Straightforward-THP | 2-Para-THP | 3-Para-THP |
| --- | --- | --- | --- |
| Multipliers | 2L | 6L + 1 | 9L + 3 |
| Adders | 2L | 6L + 2N | 9L + 2N + 2N² + 1 |
| Modulo Devices | 1 | N + 1 | 1 + N + N² |
| Multiplexers | None | One W-bit N-to-1 mux One $W_v$-bit N-to-1 mux | One W-bit N-to-1 mux One $W_v$-bit N-to-1 mux One W-bit N²-to-1 mux One $W_v$-bit N²-to-1 mux |
| Critical Path | $5T_a + 2T_m + T_{mod}$ | $4T_a + T_m + T_{mod} + T_{mux}$ | $6T_a + T_m + T_{mod} + 2T_{mux}$ |

What is claimed is:

1. An integrated circuit for parallel Tomlinson-Harashima precoder, comprising:

first and second computation units to precode symbols in parallel corresponding to sequential samples of a modulated signal;

wherein the first computation unit includes a first modulo device to precode a first symbol from a combination of a first one of the sequential samples and first and second precoded symbols previously output in parallel from the first and second computation units, and to generate a compensation signal having N possible values;

wherein the second computation unit includes N modulo devices, each to receive a combination of the first sequential sample, a second one of the sequential samples, the first and second precoded symbols previously output in parallel from the first and second computation units, and a corresponding one of N precomputed values of the compensation signal, and to output a corresponding modulo output; and wherein the second computation unit further includes a multiplexer to select one of the N modulo outputs in response to the compensation signal and to output the selected modulo output as a second precoded symbol in parallel with the first precoded symbol.

2. The integrated circuit in claim 1 as part of a data transmission system over copper.

3. The integrated circuit in claim 1 as part of a data transmission system over fiber.

4. The integrated circuit in claim 1 as part of a data transmission system over wireless.

5. The integrated circuit in claim 1 as part of a data storage system.

6. A system, comprising:
first and second computation units to precode symbols in parallel corresponding to sequential samples of a modulated signal;
wherein the first computation unit includes a first modulo device to precode a first symbol from a combination of a first one of the sequential samples, first and second precoded symbols previously output in parallel from the first and second computation units, respectively, and corresponding first and second compensation signals previously output from the first and second computation units, and to generate a new compensation signal having N possible values;
wherein the second computation unit includes N modulo devices, each to receive a combination of the first sequential sample, a second one of the sequential samples, the first and second precoded symbols and corresponding compensation signals previously output from the first and second computation units, and a corresponding one of N precomputed values of the new compensation signal generated by the first computation unit, and to output a corresponding modulo output and compensation signal;
wherein the second computation unit further includes multiplexer logic to output one of the N modulo outputs as a second precoded symbol in parallel with the first precoded symbol and to output a corresponding one of the N compensation signals in response to the new compensation signal generated by the first computation unit.

* * * * *